United States Patent
Srivastava et al.

(10) Patent No.: US 12,225,493 B2
(45) Date of Patent: Feb. 11, 2025

(54) METHODS, SYSTEMS, AND COMPUTER READABLE MEDIA FOR PROVIDING SERVICE-BASED INTERFACE (SBI) SUPPORT FOR NETWORK FUNCTIONS (NFS) NOT SUPPORTING SBI SERVICE OPERATIONS

(71) Applicant: Oracle International Corporation, Redwood Shores, CA (US)

(72) Inventors: Ankit Srivastava, Uttar Pradesh (IN); Avinash Jha, Mumbai (IN); Anup Shivarajapura, Bangalore (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 988 days.

(21) Appl. No.: 17/219,366

(22) Filed: Mar. 31, 2021

(65) Prior Publication Data
US 2022/0322270 A1 Oct. 6, 2022

(51) Int. Cl.
*H04W 60/04* (2009.01)
*H04W 4/20* (2018.01)
*H04W 8/00* (2009.01)

(52) U.S. Cl.
CPC ............ *H04W 60/04* (2013.01); *H04W 4/20* (2013.01); *H04W 8/005* (2013.01)

(58) Field of Classification Search
CPC ....... H04W 60/04; H04W 4/20; H04W 8/005; H04L 67/10; H04L 67/2866; H04L 67/30;
(Continued)

(56) References Cited

U.S. PATENT DOCUMENTS

2019/0379544 A1\* 12/2019 Suthar .................. H04L 63/08
2022/0007150 A1\* 1/2022 Edge ...................... H04W 4/20
2024/0056788 A1\* 2/2024 Godin .................. H04W 48/16

FOREIGN PATENT DOCUMENTS

EP 3 737 127 A1 11/2020

OTHER PUBLICATIONS

Notification of Transmittal of the International Search Report and the Written Opinion of the International Searching Authority, or the Declaration for International Application No. PCT/US2022/020185 (Jun. 10, 2022).

(Continued)

*Primary Examiner* — Marcus Hammonds
(74) *Attorney, Agent, or Firm* — Jenkins, Taylor & Hunt, P.A.

(57) ABSTRACT

A method for providing service based interface (SBI) support for network elements (NEs) not supporting SBI service operations includes receiving SBI configuration parameters for an NE not supporting SBI service operations. The method further includes establishing a connection with the NE not supporting SBI service operations. The method further includes registering, with a network function (NF) repository function (NRF) and using the SBI configuration parameters, the NE not supporting SBI service operations. The method further includes monitoring, over the connection, status of the NE not supporting SBI service operations. The method further includes updating, with the NRF, the status of the NE not supporting SBI service operations.

18 Claims, 7 Drawing Sheets

(58) Field of Classification Search
CPC ....... H04L 67/535; H04L 67/55; H04L 69/40; H04L 41/0226
See application file for complete search history.

(56) References Cited

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"InterWorking and Mediation Function (IWF), Cloud Native User's Guide," Oracle Communications, pp. 1-23 (May 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

3rd Generation Partnership Project; Technical Specification Group Core Network and Terminals; 5G System; Restoration Procedures (Release 16), 3GPP TS 23.527, V16.5.0, pp. 1-24 (Dec. 2020).

"3rd Generation Partnership Project; Technical Specification Group Core Network and Terminals; Numbering, addressing and identification; (Release 17)," 3GPP TS 23.003, V17.0.0, pp. 1-142 (Dec. 2020).

"Cloud Native Core Console User's Guide," Oracle Communications, Release 1.1.0, pp. 1-44 (May 2020).

Bray, "The JavaScript Object Notation (JSON) Data Interchange Format," Internet Engineering Task Force (IETF), RFC 8259, pp. 1-16 (Dec. 2017).

Fielding et al., "Hypertext Transfer Protocol (HTTP/1.1): Semantics and Content," Internet Engineering Task Force (IETF), RFC 7231, pp. 1-102 (Jun. 2014).

Fajardo et al., "Diameter Base Protocol," Internet Engineering Task Force (IETF), RFC 6733, pp. 1-153 (Oct. 2012).

Leach et al., "A Universally Unique Identifier (UUID) URN Namespace," Network Working Group, RFC 4122, pp. 1-32 (Jul. 2005).

\* cited by examiner

METHODS, SYSTEMS, AND COMPUTER READABLE MEDIA FOR PROVIDING SERVICE-BASED INTERFACE (SBI) SUPPORT FOR NETWORK FUNCTIONS (NFS) NOT SUPPORTING SBI SERVICE OPERATIONS

TECHNICAL FIELD

The subject matter described herein relates to interoperability in communications networks. More particularly, the subject matter described herein relates to methods, systems, and computer readable media for providing SBI support for NFs not supporting SBI service operations.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and SCP load balances traffic among producer NF service instances that provide the required services or directly routes the traffic to the destination producer NF instances.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks occurs when Interacting with network functions that do not support SBI service operations. In 5G networks, the service based interface is the interface over which 5G network elements, referred to as NFs, communicate with each other. Third Generation Partnership Project (3GPP) standards, such as 3GPP Technical Specification (TS) 29.510, define operations, referred to as service operations, performed over the SBI. Examples of service operations include the NFRegister service operation that allows an NF to register its identity with an NF repository function, an NFUpdate operation, which allows an NF to update its status with the NRF, and an NF Heart-Beat operation, which is a subset of the NFUpdate operation, and which allows an NF to periodically communicate its availability to the NRF. Another NF service operation is the NFDiscover service operations, which allows other NFs to discover the identity and other attributes of an NF that is registered with the NRF.

In non-5G networks, there is no concept of registering a network element or network function with an NRF. However, it may be desirable to interact with non-SBI network elements, such as a 4G/5G equipment identity register (EIR), an application function (AF), or an application server (AS), that does not support SBI service operations. There may also be a need to provide updates in status of such nodes to 5G NFs. However, because non-SBI NEs do not communicate using the SBI service operations, there is no ability to inform 5G NFs of the identity or status of non-SBI NEs.

In light of these and other difficulties, there exists a need for a methods, systems, and computer readable media for providing SBI support for NEs that do not support SBI service operations.

SUMMARY

A method for providing service based interface (SBI) support for network elements (NEs) not supporting SBI service operations includes receiving SBI configuration parameters for an NE not supporting SBI service operations is provided. The method includes establishing a connection with the NE not supporting SBI service operations. The method further includes registering, with a network function (NF) repository function (NRF) and using the SBI configuration parameters, the NE not supporting SBI service operations. The method further includes monitoring, over the connection, status of the NE not supporting SBI service operations. The method further includes updating, with the NRF, the status of the NE not supporting SBI service operations.

According to another aspect of the subject matter described herein, receiving SBI configuration parameters includes receiving NF profile parameters for creating an NF profile for the NE not supporting SBI service operations.

According to another aspect of the subject matter described herein, registering the NE not supporting SBI service operations includes performing an NFRegister service operation with the NRF on behalf of the NE not supporting SBI service operations.

According to another aspect of the subject matter described herein, performing the NFRegister service operation includes transmitting, to the NRF, a hypertext transfer protocol (HTTP) PUT message including an NF profile for the NE not supporting SBI service operations.

According to another aspect of the subject matter described herein, establishing a connection with the NE not supporting SBI service operations includes establishing a transport layer connection between an interworking function (IWF) and the NE not supporting SBI service operations.

According to another aspect of the subject matter described herein, monitoring the status of the NE not supporting SBI service operations includes exchanging, by the IWF and over the connection, Diameter watchdog messages with the NE not supporting SBI service operations.

According to another aspect of the subject matter described herein, updating, with the NRF, the status of the NE not supporting SBI service operations with the NRF includes performing an NF Heart-Beat service operation with the NRF on behalf of the NE not supporting SBI service operations.

According to another aspect of the subject matter described herein, monitoring the status of the NE not supporting SBI service operations includes detecting, using a native protocol of the NE not supporting SBI service operations, that the NE not supporting SBI service operations is available, and performing the NF Heart-Beat service operation includes sending a hypertext transfer protocol (HTTP) PATCH message to the NRF within a heart-beat interval and indicating a replace operation on an nfStatus attribute of an NF profile of the NE not supporting SBI service operations and a value of the nfStatus attribute as REGISTERED.

According to another aspect of the subject matter described herein, updating, with the NRF, the status of the NE not supporting SBI service operations includes performing an NFUpdate service operation with the NRF on behalf of the NE not supporting SBI service operations.

According to another aspect of the subject matter described herein, monitoring the status of the NE not supporting SBI service operations includes detecting unreachability of the NE not supporting SBI service operations using a native protocol of the NE not supporting SBI service operations and wherein performing the NFUpdate service operation on behalf of the NE not supporting SBI service operations includes sending a hypertext transfer protocol (HTTP) PATCH message to the NRF indicating a replace operation on an nfStatus attribute of an NF profile of the NE not supporting SBI service operations and a value of the nfStatus attribute as UNDISCOVERABLE.

According to another aspect of the subject matter described herein, a system for providing service based interface (SBI) support for network elements (NEs) not supporting SBI service operations includes a cloud native core console (CNCC) for receiving SBI configuration parameters for an NE not supporting SBI service operations and registering, with a network function (NF) repository function (NRF) and using the SBI configuration parameters, the NE not supporting SBI service operations. The system further includes an interworking function (IWF) for establishing a connection with the NE not supporting SBI service operations and monitoring, over the connection, status of the NE not supporting SBI service operations. The CNCC is configured to update, with the NRF and based on the status monitored by the IWF, the status of the NE not supporting SBI service operations.

According to another aspect of the subject matter described herein, the CNCC is configured to receive NF profile parameters for creating an NF profile for the NE not supporting SBI service operations.

According to another aspect of the subject matter described herein, the CNCC is configured to register the NE not supporting SBI service operations by performing an NFRegister service operation with the NRF on behalf of the NE not supporting SBI service operations.

According to another aspect of the subject matter described herein, the CNCC is configured to perform the NFRegister service operation by transmitting, to the NRF, a hypertext transfer protocol (HTTP) PUT message including an NF profile for the NE not supporting SBI service operations.

According to another aspect of the subject matter described herein, the connection with the NE not supporting SBI service operations comprises a transport layer connection.

According to another aspect of the subject matter described herein, the IWF is configured to monitoring the status of the NE not supporting SBI service operations by exchanging, over the connection, Diameter watchdog messages with the NE not supporting SBI service operations.

According to another aspect of the subject matter described herein, the CNCC is configured to update, with the NRF, the status of the NE not supporting SBI service operations with the NRF by performing an NF Heart-Beat service operation with the NRF on behalf of the NE not supporting SBI service operations. The system of claim 17 wherein the IWF is configured to monitor the status of the NE not supporting SBI service operations by detecting, using a native protocol of the NE not supporting SBI service operations, that the NE not supporting SBI service operations is available, and the CNCC is configured to perform the NF Heart-Beat service operation by sending a hypertext transfer protocol (HTTP) PATCH message to the NRF within a heart-beat interval and indicating a replace operation on an nfStatus attribute of an NF profile of the NE not supporting SBI service operations and a value of the nfStatus attribute as REGISTERED.

According to another aspect of the subject matter described herein, the IWF is configured to monitor the status of the NE not supporting SBI service operations by detecting unreachability of the NE not supporting SBI service operations using a native protocol of the NE not supporting SBI service operations and the CNCC is configured to update the status of the NE not supporting SBI service operations by performing an NFUpdate service operation on behalf of the NE not supporting SBI service operations including sending a hypertext transfer protocol (HTTP) PATCH message to the NRF indicating a replace operation on an nfStatus attribute of an NF profile of the NE not supporting SBI service operations and a value of the nfStatus attribute as UNDISCOVERABLE.

According to another aspect of the subject matter described herein, a non-transitory computer readable medium having stored thereon executable instructions that when executed by a processor of a computer control the computer to perform steps is provided. The steps include receiving service based interface (SBI) configuration parameters for a network element (NE) not supporting SBI service operations. The steps further include establishing a connection with the NE not supporting SBI service operations. The steps further include registering, with a network function (NF) repository function (NRF) and using the SBI configuration parameters, the NE not supporting SBI service operations. The steps further include monitoring, over the connection, status of the NE not supporting SBI service operations. The steps further include updating, with the NRF, the status of the NE not supporting SBI service operations.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
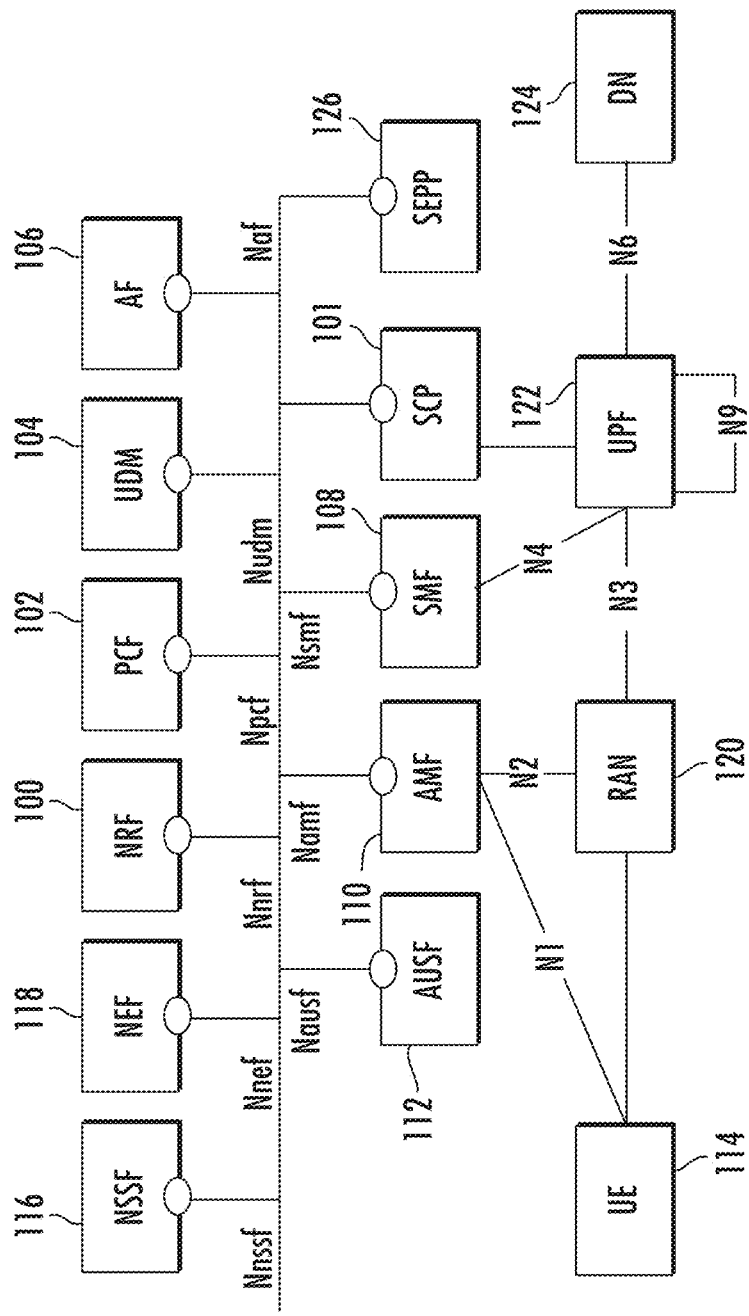
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As described above, one problem that can occur in 5G networks is the inability of NFs not supporting SBI service operations to communicate their identities to 5G NFs and to update their statuses with 5G NFs by communicating with the NRF over the SBI. Examples of non-SBI NEs for which use cases may exist in 5G networks include the above-mentioned EIR, AF, and AS, a policy control function (PCF), a home subscriber server (HSS), a home location register (HLR), or other non-SBI network element for which there is a need to interface with NFs in the 5G network.

Figure 2A:
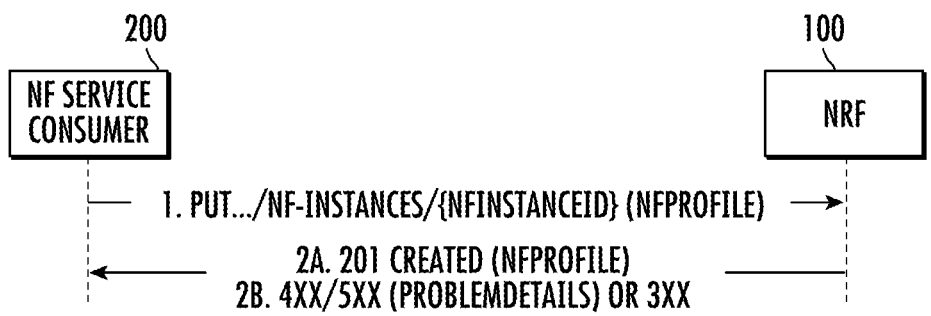
FIG. 2A is a message flow diagram illustrating exemplary messages exchanged for an NFRegister service operation.

One example of an SBI service operation that it may be desirable to provide on behalf of a non-SBI NE is the NFRegister service operation. FIG. 2A is a message flow diagram illustrating exemplary messages that may be exchanged in performing the NFRegister service operation. The NFRegister service operation is defined in 3GPP TS 29.510. The NFRegister service operation is used to register an NF with the NRF by providing the NF profile of the requesting NF to the NRF. The NF profile is a data structure that describes the NF, the services offered by the NF, and identities for communicating with the NF. When an NF successfully invokes the NFRegister service operation, the NRF marks the requesting NF as available to be discovered by other NFs. The NFRegister service operation is also used to register services associated with an existing NF instance.

The NFRegister service operation is also used to register NRF information and other information, and this information is used for forwarding or redirecting the service discovery request Referring to the message flow in FIG. 2A, in line 1, a requesting NF service consumer 200 sends an HTTP PUT message to NRF 100. The HTTP PUT message includes a resource uniform resource identifier (URI) representing the NF instance. The URI is determined by the NF instance. The variable "nfInstanceId" represents an identifier provided by NF service consumer 200 that is globally unique inside the PLMN of NRF 100 where the NF is being registered. The format of the NF instance ID is a universally unique identifier (UUID) version 4, as described in Internet Engineering Task Force (IETF) request for comments (RFC) 4122.

The payload body of the PUT request contains a representation of the NF instance to be created. In the example in FIG. 2A, the representation is specified by the NF profile. The NF profile is a data structure that includes the attributes illustrated in Table 1 below:

TABLE 1

| | | | | |
|---|---|---|---|---|
| NF profile attributes | | | | |
| | Data type | P | Cardinality | Description |
| nfInstanceId | NfInstanceId | M | 1 | Unique identity of the NF Instance. |
| nfType | NFType | M | 1 | Type of Network Function |
| nfStatus | NFStatus | M | 1 | Status of the NF Instance (NOTE 5) (NOTE 16) |
| nfInstanceName | string | O | 0 . . . 1 | Human readable name of the NF Instance |
| heartBeatTimer | integer | C | 0 . . . 1 | Time in seconds expected between 2 consecutive heart-beat messages from an NF Instance to the NRF. It may be included in the registration request. When present in the request it shall contain the heartbeat time proposed by the NF service consumer. It shall be included in responses from NRF to registration requests (PUT) or in Defined in section six point 1.6 point 2.2 of 3GPP TS 29.510. Table one shown below illustrates an example of the attributes that are included in an NF profile, updates (PUT or PATCH). If the proposed heartbeat time is acceptable by the NRF based on the local configuration, it shall use the same value as in the registration request; otherwise the NRF shall override the value using a preconfigured value. |
| plmnList | array(PlmnId) | C | 1 . . . N | PLMN(s) of the Network Function (NOTE 7) This IE shall be present if this information is available for the NF. If not provided, PLMN ID(s) of the PLMN of the NRF are assumed for the NF. |
| snpnList | array(PlmnIdNid) | C | 1 . . . N | SNPN(s) of the Network Function. This IE shall be present if the NF pertains to one or more SNPNs. |
| sNssais | array(ExtSnssai) | O | 1 . . . N | Single Network Slice Selection Assistance Information (S-NSSAIs) of the Network Function. If not provided, and if the perPlmnSnssaiList attribute is not present, the NF can serve any S-NSSAI. When present this IE represents the list of S-NSSAIs supported in all the PLMNs listed in the plmnList IE. If the sNSSAIs attribute is provided in at least one NF Service, the S-NSSAIs supported by the NF Profile shall be the set or a superset of the S-NSSAIs of the NFService(s). |
| perPlmnSnssaiList | array(PlmnSnssai) | O | 1 . . . N | This IE may be included when the list of S-NSSAIs supported by the NF for each PLMN it is supporting is different. When present, this IE shall include the S-NSSAIs supported by the Network Function for each PLMN supported by the Network Function. When present, this IE shall override sNssais IE. (NOTE 9) If the perPlmnSnssaiList attribute is provided in at least one NF Service, the S-NSSAIs supported per PLMN in the NF Profile shall be the set or a superset of the perPlmnSnssaiList of the NFService(s). |

TABLE 1-continued

NF profile attributes

| | Data type | P | Cardinality | Description |
|---|---|---|---|---|
| nsiList | array(string) | O | 1 ... N | NSI identities of the Network Function. If not provided, the NF can serve any NSI. |
| fqdn | Fqdn | C | 0 ... 1 | FQDN of the Network Function (NOTE 1) (NOTE 2) (NOTE 18). ForAMF, the FQDN registered with the NRF shall be that of the AMF Name (see 3GPP TS 23.003 [12] clause 28.3.2.5). |
| interPlmnFqdn | Fqdn | C | 0 ... 1 | If the NF needs to be discoverable by other NFs in a different PLMN, then an FQDN that is used for inter-PLMN routing as specified in 3GPP TS 23.003 [12] shall be registered with the NRF (NOTE 8). A change of this attribute shall result in triggering a "NF_PROFILE_CHANGED" notification from NRF towards subscribing NFs located in a different PLMN, but the new value shall be notified as a change of the "fqdn" attribute. |
| ipv4Addresses | array(Ipv4Addr) | C | 1 ... N | IPv4 address(es) of the Network Function (NOTE 1) (NOTE 2) (NOTE 18) |
| ipv6Addresses | array(Ipv6Addr) | C | 1 ... N | IPv6 address(es) of the Network Function (NOTE 1) (NOTE 2) (NOTE 18) |
| allowedPlmns | array(PlmnId) | O | 1 ... N | PLMNs allowed to access the NF instance. If not provided, any PLMN is allowed to access the NF. This attribute shall not be included in profile change notifications to subscribed NFs. (NOTE 17) |
| allowedSnpns | array(PlmnIdNid) | O | 1 ... N | SNPNs allowed to access the NF instance. If this attribute is present in the NFService and in the NF profile, the attribute from the NFService shall prevail. The absence of this attribute in both the NFService and in the NF profile indicates that no SNPN, other than the SNPN(s) registered in the snpnList attribute of the NF Profile, is allowed to access the service instance. This attribute shall not be included in profile change notifications to subscribed NFs. (NOTE 17) |
| allowedNfTypes | array(NFType) | O | 1 ... N | Type of the NFs allowed to access the NF instance. If not provided, any NF type is allowed to access the NF. This attribute shall not be included in profile change notifications to subscribed NFs. (NOTE 17) |
| allowedNfDomains | array(string) | O | 1 ... N | Pattern (regular expression according to the ECMA-262 dialect [8]) representing the NF domain names within the PLMN of the NRF allowed to access the NF instance. If not provided, any NF domain is allowed to access the NF. This attribute shall not be included in profile change notifications to subscribed NFs. (NOTE 17) |
| allowedNssais | array(ExtSnssai) | O | 1 ... N | S-NSSAI of the allowed slices to access the NF instance. If not provided, any slice is allowed to access the NF. This attribute shall not be included in profile change notifications to subscribed NFs. (NOTE 17) |
| priority | integer | O | 0 ... 1 | Priority (relative to other NFs of the same type) within the range 0 to 65535, to be used for NF selection; lower values indicate a higher priority. Priority may or may not be present in the nfServiceList parameters, xxxInfo parameters and in this attribute. Priority in the nfServiceList has precedence over the priority in this attribute, which has precedence over the priority in xxxInfo parameter. (NOTE 4). |

TABLE 1-continued

NF profile attributes

| | Data type | P | Cardinality | Description |
|---|---|---|---|---|
| capacity | integer | O | 0 ... 1 | The NRF may overwrite the received priority value when exposing an NFProfile with the Nnrf_NFDiscovery service. Static capacity Information within the range 0 to 65535, expressed as a weight relative to other NF instances of the same type; if capacity is also present in the nfServiceList parameters, those will have precedence over this value. (NOTE 4). |
| load | integer | O | 0 ... 1 | Dynamic load Information, within the range 0 to 100, indicates the current load percentage of the NF. |
| loadTimeStamp | DateTime | O | 0 ... 1 | It indicates the point in time in which the latest load Information (sent by the NF in the "load" attribute of the NF Profile) was generated at the NF Instance. If the NF did not provide a timestamp, the NRF should set it to the instant when the NRF received the message where the NF provided the latest load Information. |
| locality | string | O | 0 ... 1 | Operator defined Information about the location of the NF instance (e.g. geographic location, data center) (NOTE 3) |
| udrInfo | UdrInfo | O | 0 ... 1 | Specific data for the UDR (ranges of subscription permanent identifier (SUPI), group ID ... ) |
| udrInfoList | map(UdrInfo) | O | 1 ... N | Multiple entries of UdrInfo. This attribute provides additional Information to the udrInfo. udrInfoList may be present even if the udrInfo is absent. The key of the map shall be a (unique) valid JSON string per clause 7 of IETF RFC 8259 [22], with a maximum of 32 characters. |
| udmInfo | UdmInfo | O | 0 ... 1 | Specific data for the UDM (ranges of SUPI, group ID ... ) |
| udmInfoList | map(UdmInfo) | O | 1 ... N | Multiple entries of UdmInfo. This attribute provides additional Information to the udmInfo. udmInfoList may be present even if the udmInfo is absent. The key of the map shall be a (unique) valid JSON string per clause 7 of IETF RFC 8259 [22], with a maximum of 32 characters. |
| ausfInfo | AusfInfo | O | 0 ... 1 | Specific data for the AUSF (ranges of SUPI, group ID ... ) |
| ausfInfoList | map(AusfInfo) | O | 1 ... N | Multiple entries of AusfInfo. This attribute provides additional information to the ausfInfo. ausfInfoList may be present even if the ausfInfo is absent. The key of the map shall be a (unique) valid JSON string per clause 7 of IETF RFC 8259 [22], with a maximum of 32 characters. |
| amfInfo | AmfInfo | O | 0 ... 1 | Specific data for the AMF (AMF Set ID, ... ) |
| amfInfoList | map(AmfInfo) | O | 1 ... N | Multiple entries of AmfInfo. This attribute provides additional Information to the amfInfo. amfInfoList may be present even if the amfInfo is absent. The key of the map shall be a (unique) valid JSON string per clause 7 of IETF RFC 8259 [22], with a maximum of 32 characters. |
| smfInfo | SmfInfo | O | 0 ... 1 | Specific data for the SMF (DNN's, ... ). (NOTE 12) |
| smfInfoList | map(SmfInfo) | O | 1 ... N | Multiple entries of SmfInfo. This attribute provides additional Information to the smfInfo. smfInfoList may be present even if the smfInfo is absent. The key of the map shall be a (unique) valid JSON string per clause 7 of IETF RFC 8259 [22], with a maximum of 32 characters. (NOTE 12) |
| upfInfo | UpfInfo | O | 0 ... 1 | Specific data for the UPF (S-NSSAI, DNN, SMF serving area, interface ... ) |

TABLE 1-continued

NF profile attributes

| | Data type | P | Cardinality | Description |
|---|---|---|---|---|
| upfInfoList | map(UpfInfo) | O | 1...N | Multiple entries of UpfInfo. This attribute provides additional Information to the upfInfo. upfInfoList may be present even if the upfInfo is absent.<br>The key of the map shall be a (unique) valid JSON string per clause 7 of IETF RFC 8259 [22], with a maximum of 32 characters. |
| pcfInfo | PcfInfo | O | 0...1 | Specific data for the PCF |
| pcfInfoList | map(PcfInfo) | O | 1...N | Multiple entries of PcfInfo. This attribute provides additional Information to the pcfInfo. pcfInfoList may be present even if the pcfInfo is absent.<br>The key of the map shall be a (unique) valid JSON string per clause 7 of IETF RFC 8259 [22], with a maximum of 32 characters. |
| bsfInfo | BsfInfo | O | 0...1 | Specific data for the binding support function (BSF) |
| bsfInfoList | map(BsfInfo) | O | 1...N | Multiple entries of BsfInfo. This attribute provides additional Information to the bsfInfo. bsfInfoList may be present even if the bsfInfo is absent.<br>The key of the map shall be a (unique) valid JSON string per clause 7 of IETF RFC 8259 [22], with a maximum of 32 characters. |
| chfInfo | ChfInfo | O | 0...1 | Specific data for the charging function (CHF) |
| chfInfoList | map(ChfInfo) | O | 1...N | Multiple entries of ChfInfo. This attribute provides additional Information to the chfInfo. chfInfoList may be present even if the chfInfo is absent.<br>The key of the map shall be a (unique) valid JSON string per clause 7 of IETF RFC 8259 [22], with a maximum of 32 characters. |
| nefInfo | NefInfo | O | 0...1 | Specific data for the NEF |
| nrfInfo | NrfInfo | O | 0...1 | Specific data for the NRF |
| udsfInfo | UdsfInfo | O | 0...1 | Specific data for the unstructured data storage function (UDSF) |
| udsfInfoList | map(UdsfInfo) | O | 1...N | Multiple entries of udsfInfo. This attribute provides additional information to the udsfInfo. udsfInfoExt may be present even if the udsfInfo is absent. |
| nwdafInfo | NwdafInfo | O | 0...1 | Specific data for the network data acquisition function (NWDAF). |
| pcscfInfoList | map(PcscfInfo) | O | 1...N | Specific data for the proxy call session control function (P-CSCF).<br>The key of the map shall be a (unique) valid JSON string per clause 7 of IETF RFC 8259 [22], with a maximum of 32 characters.<br>(NOTE 11) |
| hssInfoList | map(HssInfo) | O | 1...N | Specific data for the HSS.<br>The key of the map shall be a (unique) valid JSON string per clause 7 of IETF RFC 8259 [22], with a maximum of 32 characters. |
| customInfo | object | O | 0...1 | Specific data for custom Network Functions |
| recoveryTime | DateTime | O | 0...1 | Timestamp when the NF was (re)started (NOTE 5) (NOTE 6) |
| nfServicePersistence | boolean | O | 0...1 | true: If present, and set to true, it indicates that the different service instances of a same NF Service in this NF instance, supporting a same API version, are capable to persist their resource state in shared storage and therefore these resources are available after a new NF service instance supporting the same API version is selected by a NF Service Consumer (see 3GPP TS 23.527 [27]). |

TABLE 1-continued

| | | | | NF profile attributes |
|---|---|---|---|---|
| | Data type | P | Cardinality | Description |
| nfServices | array(NFService) | O | 1 . . . N | false (default): Otherwise, it indicates that the NF Service Instances of a same NF Service are not capable to share resource state inside the NF Instance.<br>List of NF Service Instances. It shall include the services produced by the NF that can be discovered by other NFs, if any. (NOTE 15)<br>This attribute is deprecated; the attribute "nfServiceList" should be used instead. |
| nfServiceList | map(NFService) | O | 1 . . . N | Map of NF Service Instances, where the "serviceInstanceId" attribute of the NFService object shall be used as the key of the map. (NOTE 15)<br>It shall include the services produced by the NF that can be discovered by other NFs, if any. |
| nfProfileChangesSupportInd | boolean | O | 0 . . . 1 | NF Profile Changes Support Indicator.<br>See Annex B.<br>This IE may be present in the NFRegister or NFUpdate (NF Profile Complete Replacement) request and shall be absent in the response.<br>true: the NF Service Consumer supports receiving NF Profile Changes in the response.<br>false (default): the NF Service Consumer does not support receiving NF Profile Changes in the response.<br>Write-Only: true |
| nfProfileChangesInd | boolean | O | 0 . . . 1 | NF Profile Changes Indicator.<br>See Annex B.<br>This IE shall be absent in the request to the NRF and may be included by the NRF in NFRegister or NFUpdate (NF Profile Complete Replacement) response.<br>true: the NF Profile contains NF Profile changes.<br>false (default): complete NF Profile.<br>Read-Only: true |
| defaultNotificationSubscriptions | array(Default Notification Subscription) | O | 1 . . . N | Notification endpoints for different notification types.<br>(NOTE 10) |
| lmfInfo | LmfInfo | O | 0 . . . 1 | Specific data for the location management function (LMF) |
| gmlcInfo | GmlcInfo | O | 0 . . . 1 | Specific data for the gateway mobile location center (GMLC) |
| nfSetIdList | array(NfSetId) | C | 1 . . . N | NF Set ID defined in clause 28.12 of 3GPPTS 23.003 [12].<br>At most one NF Set ID shall be indicated per PLMN of the NF.<br>This Information shall be present if available. |
| servingScope | array(string) | O | 1 . . . N | The served area(s) of the NF instance.<br>The absence of this attribute does not imply that the NF instance can serve every area in the PLMN.<br>(NOTE 13) |
| lcHSupportInd | boolean | O | 0 . . . 1 | This Information element (IE) indicates whether the NF supports Load Control based on the load control Information (LCI) Header (see clause 6.3 of 3GPPTS 29.500 [4]).<br>true: the NF supports the feature.<br>false (default): the NF does not support the feature. |
| olcHSupportInd | boolean | O | 0 . . . 1 | This IE indicates whether the NF supports Overload Control based on OCI Header (see clause 6.4 of 3GPP TS 29.500 [4]).<br>true: the NF supports the feature.<br>false (default): the NF does not support the feature. |

TABLE 1-continued

NF profile attributes

| | Data type | P | Cardinality | Description |
|---|---|---|---|---|
| nfSetRecovery TimeList | map(DateTime) | O | 1 . . . N | Map of recovery time, where the key of the map is the NfSetId of NF Set(s) that the NF instance belongs to. When present, the value of each entry of the map shall be the recovery time of the NF Set indicated by the key. |
| serviceSetRecovery TimeList | map(DateTime) | O | 1 . . . N | Map of recovery time, where the key of the map is the NfServiceSetId of the NF Service Set(s) configured in the NF instance. When present, the value of each entry of the map shall be the recovery time of the NF Service Set indicated by the key. |
| scpDomains | array(string) | O | 1 . . . N | When present, this IE shall carry the list of SCP domains the SCP belongs to, or the SCP domain the NF (other than SCP) belongs to. (NOTE 14) |
| scpInfo | ScpInfo | O | 0 . . . 1 | Specific data for the SCP |

As illustrated in Table 1, the NF profile includes attributes that describe the 5G network function being registered. 5G network functions are configured or programmed to include an NF profile. However, non-SBI NEs do not have NF profiles and thus are incapable of registering their identities with NRF 100.

In line 2a of FIG. 2A, upon successful registration of NF instance 200, NRF 100 returns a 201 Created message. The payload body of the 201 Created message contains a representation of the created resource, and the location header of the response contains the URI of the created resource. In addition, NRF 100 returns a heart-beat timer containing the number of expected seconds between two consecutive heart-beat messages from an NF instance 200 to NRF 100. The representation of the created resource may be a complete NF profile or an NF profile including the mandatory attributes of the NF profile and the attributes which NRF 100 added or changed.

In line 2b, on failure or redirection, if the registration of NF instance 200 fails at NRF 100 due to errors in the encoding of the NF profile JSON object, NRF 100 returns a 4xx bad request status code with a problem details information element providing details of the error if the registration of the NF instance fails at NR 100 due to internal errors. NRF 100 returns a 5xx internal server error status code with the problem details information element providing details of the error. In the case of redirection, NRF 100 returns a 3xx status code which contains a location header with a URI pointing to the endpoint of another NRF service instance.

Figure 2B:
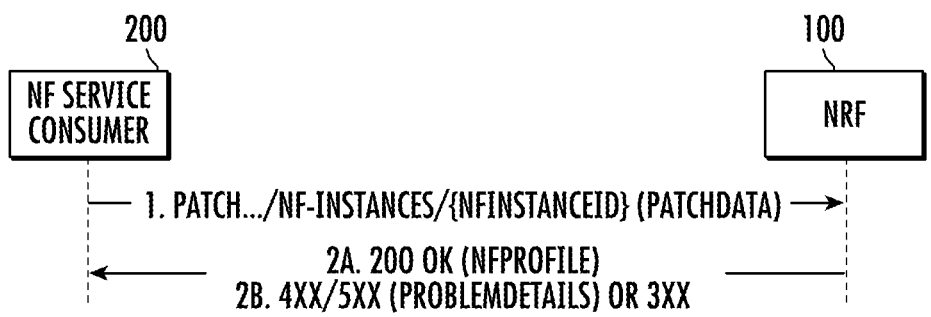
FIG. 2B is a message flow diagram illustrating exemplary messages exchanged for an NFUpdate or NF Heart-Beat service operation.

Other SBI service operations that it may be desirable to perform on behalf of a non-SBI NE include the NFUpdate service operation and the NF Heart-Beat service operation, which is a specific type of NFUpdate service operation. FIG. 2B is a message flow diagram illustrating exemplary messages exchanged for the NFUpdate service operation. The NFUpdate service operation updates the profile of an NF previously registered in the NRF by providing the updated NF profile of the requesting NF to the NRF. The NFUpdate service operation may apply to the whole profile of the NF (complete replacement of the existing profile by a new profile), or it may apply only to a subset of the parameters of the profile (including adding/deleting/replacing services to the NF profile).

In the case of using the NFUpdate service operation to perform the NF Heart-Beat service operation, a previously registered NF periodically contacts the NRF to show the NF is still operative. The time interval at which the NRF shall be contacted is deployment-specific, and it is returned by the NRF to the NF Service Consumer as a result of a successful registration. When the NRF detects that a given NF has not updated its profile for a configurable amount of time (longer than the heart-beat interval), the NRF changes the status of the NF to SUSPENDED and considers that the NF and its services can no longer be discovered by other NFs via the NFDiscovery service. The NRF notifies NFs subscribed to receiving notifications of changes of the NF Profile that the NF status has been changed to SUSPENDED.

If the NRF modifies the heart-beat interval value of a given NF instance currently registered (e.g. as a result of an operations, administration, and maintenance (OA&M) operation), it shall return the new value to the registered NF in the response of the next periodic heart-beat interaction received from that NF and, until then, the NRF shall apply the heart-beat check procedure according to the original interval value.

As illustrated by line 1 in FIG. 2B, in performing the NFUpdate service operation, NF service consumer 200 sends an HTTP PATCH request to the resource URI representing the NF Instance. If the NFUpdate service operation is being used for the NF Heart-Beat service, the payload body of the PATCH request contains a "replace" operation on the "nfStatus" attribute of the NF Profile of the NF Instance, and the value of the nfStatus attribute is set to "REGISTERED" or "UNDISCOVERABLE", depending on whether the NF is reachable or not.

In addition, the NF service consumer 200 may also provide the load information of the NF, and/or the load information of the associated NF services. The provision of such load information may be limited by this NF via appropriate configuration (e.g. granularity threshold) in order to avoid notifying minor load changes.

In line 2a of FIG. 2B, on success, NRF 100 returns a 204 No Content message. NRF 100 may also answer with 200 OK message, along with the full NF Profile, e.g. in cases where NRF 100 determines that the NF profile has changed significantly since the last heart-beat and wants to send the new profile to NF service consumer 200.

In line 2b of FIG. 2B, on failure or redirection, if the NF instance identified by the nfInstanceID is not found in the list of registered NF instances in the NRF's database, NRF 100 returns a "404 Not Found" status code with the Problem Details IE providing details of the error. In the event of redirection, NRF 100 returns a 3xx status code, which contains a location header with a URI pointing to the endpoint of another NRF service instance.

Figure 3:
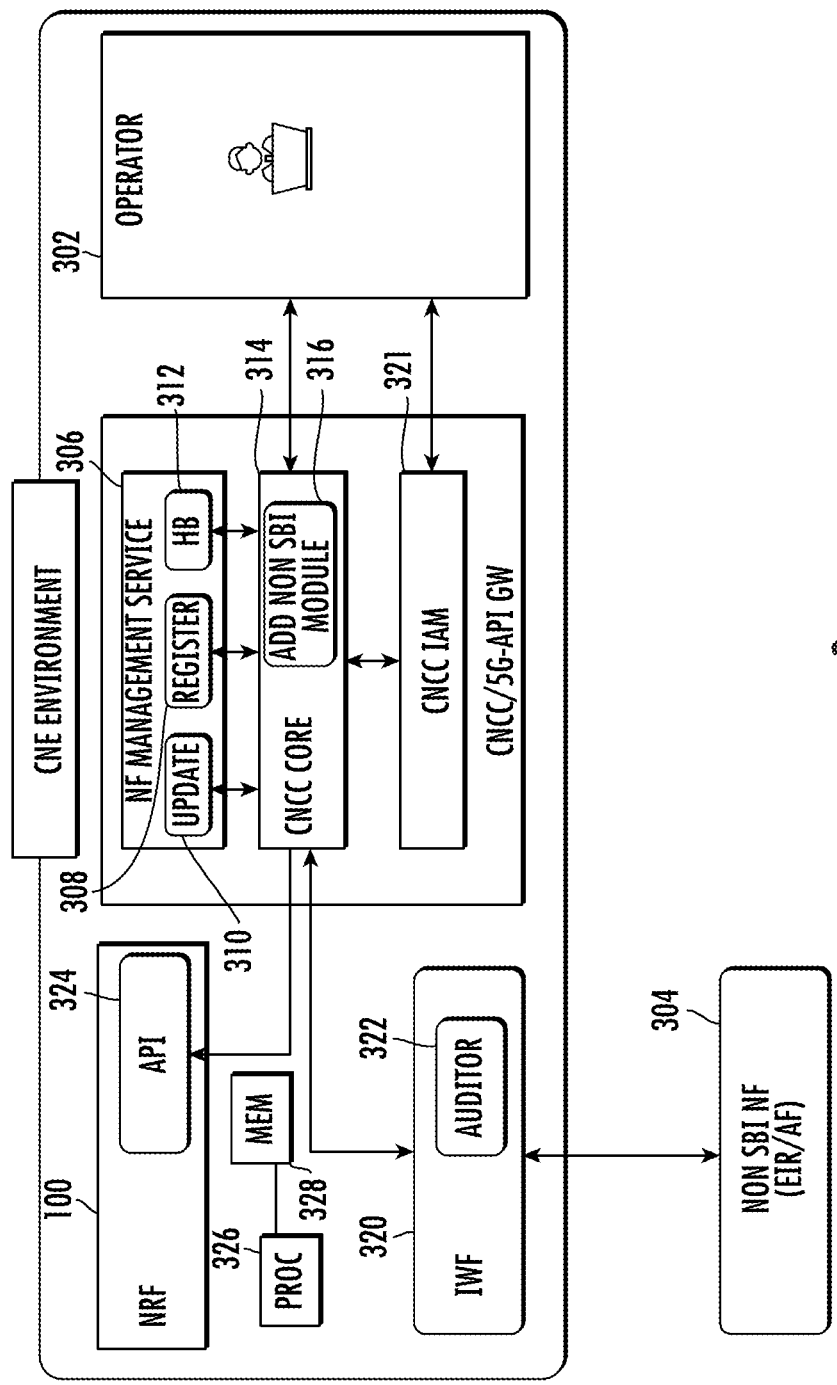
FIG. 3 is a block diagram illustrating exemplary components for providing SBI support for NEs not supporting SBI service operations.

Because non-SBI NEs do not support the service operations illustrated in FIGS. 2A and 2B, the subject matter described herein provides a mechanism for performing these service operations on behalf of the non-SBI NE. FIG. 3 is a diagram illustrating exemplary components of a system for performing SBI service operations, such as the NFRegister, NFUpdate, and NF Heart-Beat service operations described above with respect to FIGS. 2A and 2B on behalf of an NE not supporting SBI service operations. Referring to FIG. 3, a cloud native core console (CNCC) 300 receives configuration information from an operator 302 for a non-SBI NE 304, which in the illustrated example is an equipment identity register (EIR) or an application function (AF). CNCC 300 includes NF management service 306 that Includes an NFRegister module 308 that implements the above-described NFRegister service on behalf of non-SBI NE 304, an NFUpdate module 310 that implements the above-described NFUpdate service operation on behalf of non-SBI NE 304 and an NF Heart-Beat module 312 that implements the above-described NF Heart Beat service operation on behalf of non-SBI NE 304.

CNCC 300 further includes a CNCC core 314 that receives the non-SBI NE configuration parameters from operator 302 and stores the non-SBI NE configuration parameters in memory as non-SBI module 316. The non-SBI NE configuration parameters may be NF profile parameters, such as those illustrated in Table 1, and CNCC 300 may create an NF profile for non-SBI NE 304 using the received parameters. CNCC 300 further includes a CNCC identity access management (IAM) module 321 that performs authentication and authorization functions of CNCC 300, such as creating and assigning roles to users.

The system illustrated in FIG. 3 further includes a non-SBI NE interworking function (IWF) 320 that interfaces directly with non-SBI NEs, such as NE 304, and also communicates with CNCC core 314. Non-SBI NE IWF 320 includes an auditor 322 that monitors the status of non-SBI NE 304 and communicates updates in status to CNCC core 314. Modules 308, 310 and 312 can be triggered by the updates in status to update the NF profile of non-SBI NE 304 with NRF 100. NRF 100 includes an application programming interface (API) 324 that is defined in 3GPP TS 29.510, and includes the messages and parameters described above with regard to FIGS. 2A and 2B.

In performing the NFRegister service operation, NFRegister module 308 receives configuration parameters from operator 302, creates an NF profile for non-SBI NE 304, and communicates the NF profile to NRF 100 using the message flow illustrated in FIG. 2A. In performing the NFUpdate service operation, NF update module 310 may be triggered by non-SBI NE IWF 320 receiving or detecting an update in one or more parameters of the NF profile of non-SBI NE 304 and will update the NF profile using the NFUpdate service operation described above with regard to FIG. 2B.

NF Heart-Beat module 312 may maintain the status of non-SBI NE 304 with NRF 100 using the NF Heart-Beat service operation described above based on results of the monitoring of non-SBI NE 304 performed by auditor 322. In one example in which non-SBI NE 304 implements the Diameter protocol, as described in IETF RFC 6733, auditor 322 may use Diameter watchdog message exchanges to monitor the status of non-SBI NE 304. Using the Diameter watchdog procedure, auditor 322 may send a Diameter watchdog request to non-SBI NE 304. Upon sending the Diameter watchdog request, auditor 322 starts a Diameter watchdog timer and waits for a Diameter watchdog response from non-SBI NE 304. If auditor 322 receives a Diameter watchdog response from non-SBI NE 304 before the timer expires, auditor 322 may reset the Diameter watchdog timer and update CNCC core 314 indicating that non-SBI NE 304 is available, and NF Heart-Beat module 312 may use the NFUpdate service operation to deliver a Heart-Beat status message to NRF 100. If auditor 322 fails to receive a response to a Diameter watchdog request before the Diameter watchdog timer expires, auditor 322 may notify CNCC core 316, which causes NFUpdate module 310 and/or NF Heart-Beat module 312 to utilize the above described NFUpdate and/or NF Heart-Beat procedure to update the reachability status (indicating UNDISCOVERABLE) of non-SBI NE 304 with NRF 100.

The components in the cloud network environment in FIG. 3 may be implemented using at least one processor 326 and memory 328. For example, CNCC 300 and IWF 320 may be implemented using computer executable instructions stored in memory 328 and executed by processor 326. It should also be noted that CNCC 300 and IWF 320 may be located on the same or different computing platforms.

Figure 4:
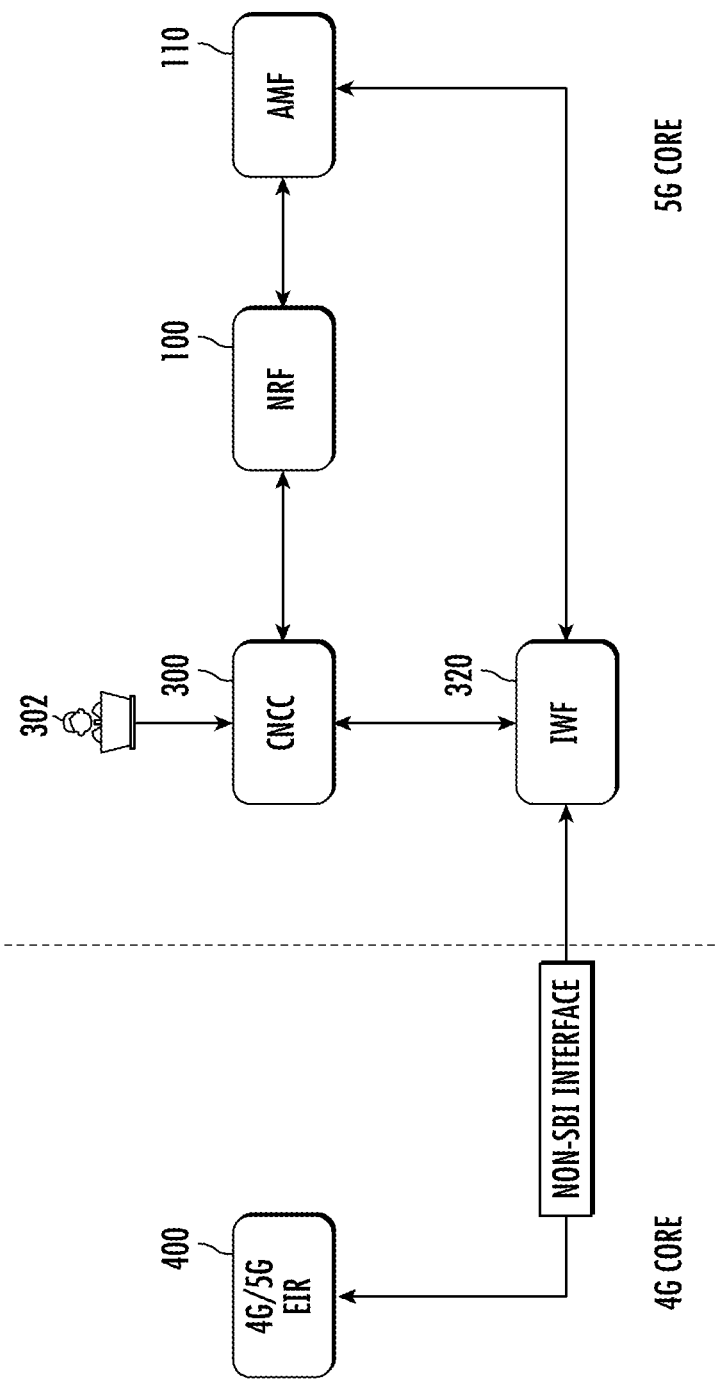
FIG. 4 is a network diagram illustrating the providing of SBI support for a 4G/5G EIR that does not support SBI service operations.

FIG. 4 illustrates an example where a 5G AMF 110 needs to communicate with a 4G/5G EIR 400, for example, to verify or obtain the international mobile equipment identifier (IMEI) of a UE. 4G/5G EIR 400 may utilize a non-SBI interface, such as a Diameter interface, to communicate with other network elements. IWF 320 may use the native non-SBI interface protocol implemented by 4G/5G EIR 400 to communicate with 4G/5G EIR 400, an SBI protocol to communicate with AMF 110, and an SBI or a proprietary interface protocol to communicate with CNCC 300. Using Diameter as an example, IWF 320 may convert between Diameter and HTTP for messaging between AMF 110 and 4G/5G EIR 400.

In the illustrated example, operator 302 may create a configuration for 4G/5G EIR 400 with CNCC 300. In response to receiving the configuration parameters, CNCC 300 may create an NF profile for 4G/5G EIR 400 and register the NF profile NRF 100. The NF profile may include all or any suitable subset of the NF profile attributes illustrated above in Table 1. IWF 320 may monitor the status of 4G/5G EIR 400 using Diameter watchdog or other suitable procedures and notify CNCC 300 of the current status of 4G/5G EIR 400. Upon receipt of notification of the status of 4G/5G EIR 400, CNCC 300 may utilize one of the above-described SBI service operations to update the status of the NF profile of 4G/5G EIR 400 with NRF 100. If AMF 110 is subscribed to receive notification of changes in the NF profile of 4G/5G EIR 400, NRF 100 will notify AMF 110 when a change or update to the NF profile occurs.

Figure 5:
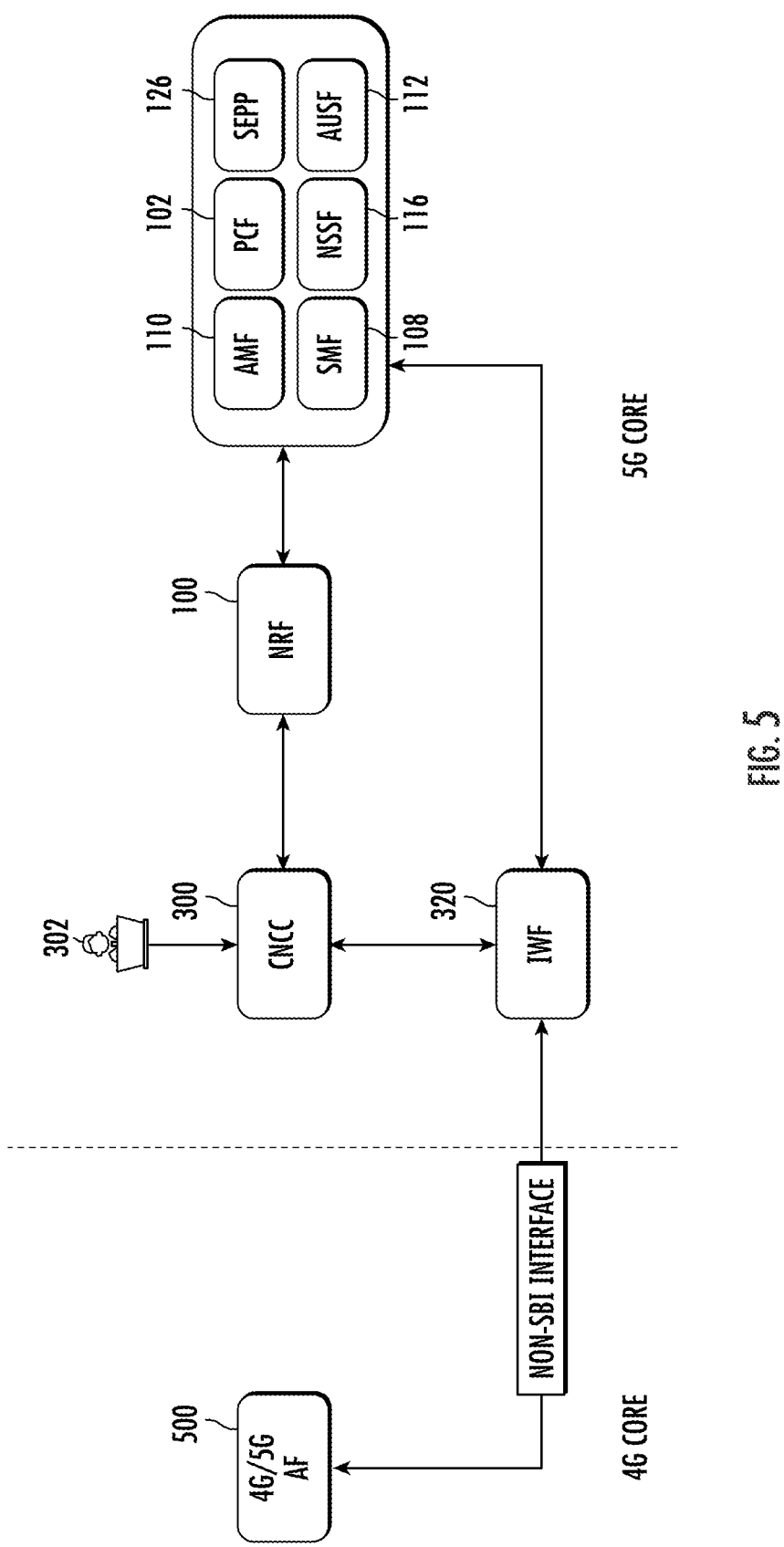
FIG. 5 is a network diagram illustrating the providing of SBI support for a 4G/5G AF or AS that does not support SBI service operations.

FIG. 5 illustrates another use case for CNCC 300 and IWF 320. In FIG. 5, an operator 302 may configure parameters for a 4G/5G AF 500 with CNCC 300. CNCC 300 may create the NF profile for 4G/5G AF 500 and register the profile within NRF 100. 5G NFs, such as AMF 110, PCF 102, SEPP 126, SMF 108, NSSF 116, and AUSF 112, may subscribe with NRF 100 to receive updates regarding the status of AF 500. IWF 320 monitors the status of AF 500 and communicates the status to CNCC 300. IWF 320 may also convert between message formats used in the 5G core with those compatible with AF 500. For example, IWF 320 may perform HTTP to Diameter conversion for messages directed to AF 500 and Diameter to HTTP conversion for messages from AF 500 to the 5G core.

Figure 6:
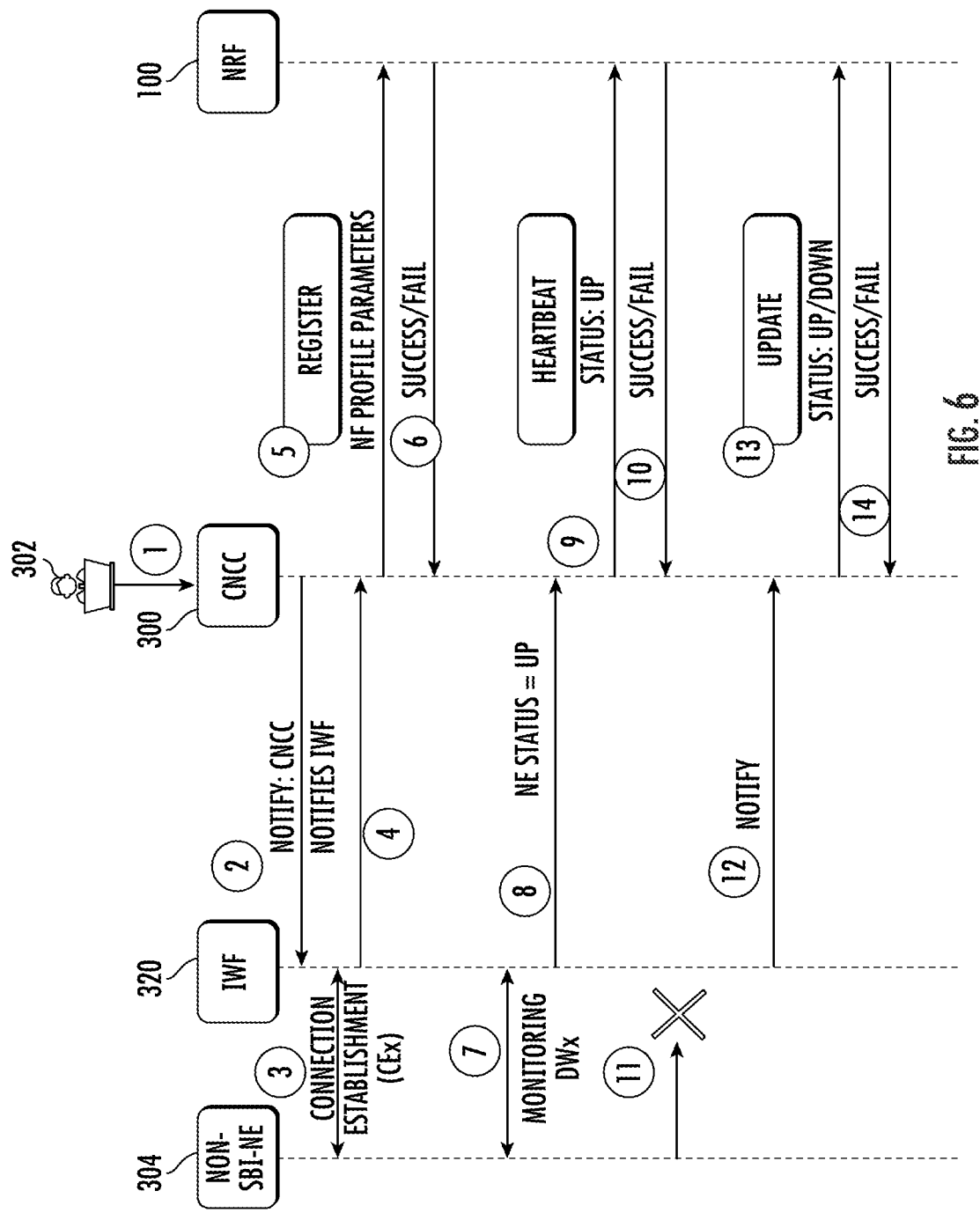
FIG. 6 is a message flow diagram illustrating exemplary messages exchanged in performing NFRegister, NFUpdate, and NF Heart-Beat service operations on behalf of an NE that does not support SBI service operations.

FIG. 6 is a message flow diagram illustrating performing NFRegister, NF Heart-Beat, and NFUpdate service operations on behalf of a non-SBI network element. Referring to FIG. 6, in step 1, a user, such as network operator 302, configures a new consumer (or producer) NF as a non-SBI network element. The parameters input by network operator 302 may be those illustrated or indicated as mandatory in the NF profile above in Table 1. The following is an example of parameters that may be configured for a non-SBI NE:

```
    parameters:
  - name: nfInstanceID
    in: path
    required: true
    description: Unique ID of the NF Instance to register
    schema:
        $ref: TS29571_CommonData.yaml#/components/schemas/NfInstanceId'
  - name: Content-Encoding
    in: header
    description: Content-Encoding, described in IETF RFC 7231
    schema:
        type: string
  - name: Accept-Encoding
    in: header
    description: Accept-Encoding, described in IETF RFC 7231
    schema:
        type: string
requestBody:
  content:
    application/json:
      schema:
          $ref: '#/components/schemas/NFProfile'
  required: true
```

In step 2, after receiving the configuration for non-SBI network element 304, CNCC 300 notifies IWF 320 of the newly configured non-SBI network element. The details include information, such as IP address or domain name, that allows IWF 320 to initiate a connection with non-SBI network element 304.

In step 3, IWF 320 establishes a connection with non-SBI network element 304. In one example, the connection is a transport layer connection, such as a transmission control protocol (TCP) or stream control transmission protocol (SCTP) connection. In step 4, IWF 320 notifies CNCC 300 that the connection has been successfully established.

In step 5, CNCC 300, upon receiving notification of successful connection establishment with non-SBI network element 304 from IWF 320, performs the NFRegister service operation with NRF 100 with sufficient details to reach non-SBI network element 304. Performing the NFRegister procedure may include sending an HTTP PUT message to NRF 100 with the relevant parameters as described above with regard to FIG. 2A. In step 6, NRF 100 responds indicating whether the registration was successful or not. The response may be any of the responses described above with regard to FIG. 2A.

In step 7, IWF 320 monitors the status of non-SBI network element 304. Monitoring the status of non-SBI network element 304 may include exchanging heartbeat messages with non-SBI network element 304 in a native protocol of non-SBI network element 304. In one example, the heartbeat messages may be Diameter watchdog messages, as described above. In another example, if non-SBI network element 304 implements SS7 or Sigtran messaging, the heartbeat messages may be message transfer part (MTP) level 3 user adaptation layer (M3UA) heartbeat messages. If non-SBI network element 304 implements session initiation protocol (SIP), the heartbeat messages may be SIP heartbeat or equivalent messages.

In step 8, IWF 320 sends a status message to CNCC 300 indicating that non-SBI network element 304 is up or available. In step 9 of the message flow diagram, CNCC 300 performs the NF Heart-Beat service operation on behalf of non-SBI network element 304. Performing the NF Heart-Beat service operation may include sending an HTTP PATCH message to NRF 100 indicating that the non-SBI network element 304 is available, as described above with regard to FIG. 2B. In step 10 of the message flow diagram, NRF 100 responds to CNCC 300 indicating whether the NF Heart-Beat service operation was successful or whether the operation failed.

In step 11 of the message flow diagram, Diameter watchdog messaging between non-SBI network element 304 and IWF 320 fails. For example, non-SBI network element 304 may fail to respond to a Diameter watchdog request message within the timeout period. In response to detecting the failure of Diameter watchdog messaging, IWF 320, in step 12, sends a notification to CNCC 300 indicating unavailability of non-SBI network element 304. I In line 13 of the message flow diagram, CNCC 300 implements the NFUpdate service operation on behalf of non-SBI network element 304 indicating to NRF 100 that non-SBI network element 304 is down or suspended. In an alternate example, the NF Heart-Beat service operation may be used to indicate that non-SBI network element 304 is down. In line 14 of the message flow diagram, NRF 100 responds to CNCC 300 with a success or failure response depending on whether the service operation was successful.

Figure 7:
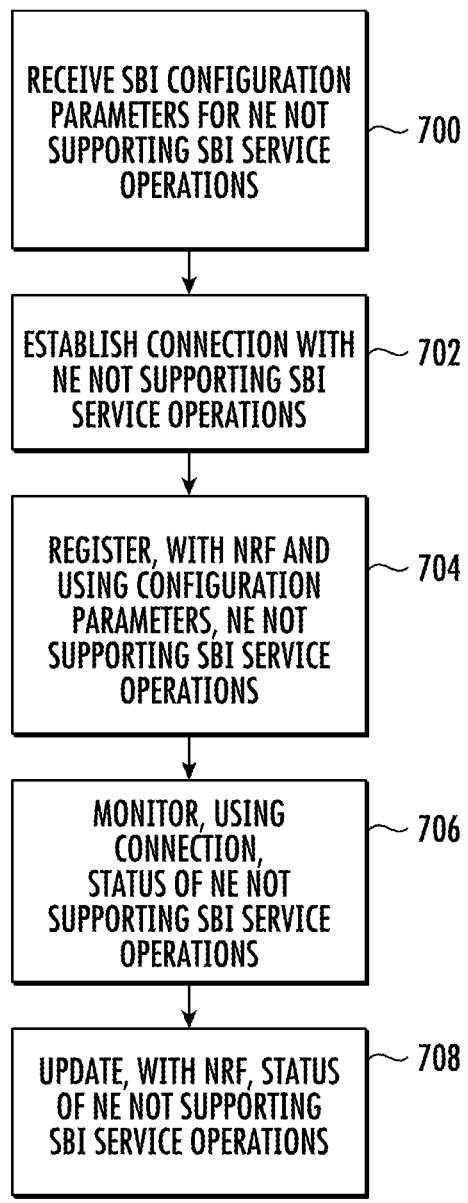
FIG. 7 is a flow chart illustrating an exemplary process for providing SBI support for an NE that does not support SBI service operations.

FIG. 7 is a flow chart illustrating a method for providing service based interface (SBI) support for NEs not supporting SBI service operations. Referring to FIG. 7, in step 700, the process includes receiving SBI configuration parameters for an NE not supporting SBI service operations. For example, CNCC 300 may receive, from operator 302, SBI configuration parameters, which may include NF profile parameters, for creating an NF profile that enables 5G NF to discover and subscribe to receive notifications regarding an non-SBI NE.

In step 702, the process includes establishing a connection with the NE not supporting SBI service operations. For example, after receiving the configuration parameters, CNCC 300 may instruct IWF 320 to create a connection with non-SBI NE 304. In response to the instruction, IWF 320 may create a transport layer connection, such as a TCP or SCTP connection with non-SBI NE 304.

In step 704, the process includes registering, with a network function (NF) repository function (NRF) and using the SBI configuration parameters, the NE not supporting SBI service operations. For example, CNCC 300 may perform the NFRegister service operation to communicate the NF profile of non-SBI network element 304 to NRF 100.

In step 706, the process includes monitoring, over the connection, status of the NE not supporting SBI service operations. For example, IWF 320 may monitor the status of non-SBI NE 304 using a native protocol of non-SBI NE 304. If the native protocol is Diameter, IWF 320 may monitor the status of non-SBI NE 304 using Diameter watchdog messaging. If the native protocol is SS7 over Sigtran, IWF 320 may monitor the status using M3UA messages. If the native protocol is SIP, IWF 320 may monitor the status using SIP messages.

In step 708, the process includes updating, with the NRF, the status of the NE not supporting SBI service operations. For example, CNCC 300 may use the NFUpdate or NF Heart Beat service operations to communicate the availability status of non-SBI NE 304 to NRF 100.

Exemplary advantages of the subject matter described herein include allowing non-SBI NEs to be registered with NRF so that NFs can discover the non-SBI NEs and receive status updates regarding the non-SBI NEs. Another advantage to providing a CNCC and an IWF that perform SBI service operations on behalf of non-SBI NEs is that the individual non-SBI NEs do not need to be configured to support SBI service operations. Thus, the solution provides scalability and configuration efficiency advantages over an approach where individual non-SBI NEs are configured to support SBI service operations.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 17), 3GPP TS 29.510 V17.0.0 (2020 December).
2. 3$^{rd}$ Generation Partnership Project; Technical Specification Group Core Network and Terminals; Numbering, addressing and identification; (Release 17), 3GPP TS 23.003 V17.0.0 (2020 December).
3. 3$^{rd}$ Generation Partnership Project; Technical Specification Group Core Network and Terminals; 5G System; Technical Realization of the Service Based Architecture; Stage 3 (Release 17), 3GPP TS 29.500 V17.1.0 (2020 December).
4. 3$^{rd}$ Generation Partnership Project; Technical Specification Group Core Network and Terminals; 5G System; Restoration Procedures (Release 16), 3GPP TS 23.527 V16.5.0 (2020 December).
5. Fajardo, et al., "Diameter Base Protocol," IETF RFC 6733 (October 2012);
6. Leach, et. al., "A Universally Unique Identifier (UUID) URN Namespace," IETF RFC 4122 (July 2005).
7. Bray, T., "The JavaScript Object Notation (JSON) Data Interchange Format," IETF RFC 8259 (December 2017).
8. Fielding, R. and Reschke, J., "Hypertext Transfer Protocol (HTTP/1.1: Semantics and Content," IETF RFC 7321 (June 2014).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing service based interface (SBI) support for network elements (NEs) not supporting SBI service operations, the method comprising:
    receiving SBI configuration parameters for an NE not supporting SBI service operations;
    establishing a connection with the NE not supporting SBI service operations;
    registering, with a network function (NF) repository function (NRF) and using the SBI configuration parameters, the NE not supporting SBI service operations, wherein registering the NE not supporting SBI service operations includes performing an NFRegister service operation with the NRF on behalf of the NE not supporting SBI service operations;
    monitoring, over the connection, status of the NE not supporting SBI service operations; and
    updating, with the NRF, the status of the NE not supporting SBI service operations.

2. The method of claim 1 wherein receiving SBI configuration parameters includes receiving NF profile parameters for creating an NF profile for the NE not supporting SBI service operations.

3. The method of claim 1 wherein performing the NFRegister service operation includes transmitting, to the NRF, a hypertext transfer protocol (HTTP) PUT message including an NF profile for the NE not supporting SBI service operations.

4. The method of claim 1 wherein establishing a connection with the NE not supporting SBI service operations includes establishing a transport layer connection between an interworking function (IWF) and the NE not supporting SBI service operations.

5. The method of claim 4 wherein monitoring the status of the NE not supporting SBI service operations includes exchanging, by the IWF and over the connection, Diameter watchdog messages with the NE not supporting SBI service operations.

6. The method of claim 1 wherein updating, with the NRF, the status of the NE not supporting SBI service operations with the NRF includes performing an NF Heart-Beat service operation with the NRF on behalf of the NE not supporting SBI service operations.

7. The method of claim 6 wherein monitoring the status of the NE not supporting SBI service operations includes detecting, using a native protocol of the NE not supporting SBI service operations, that the NE not supporting SBI service operations is available, and wherein performing the NF Heart-Beat service operation includes sending a hypertext transfer protocol (HTTP) PATCH message to the NRF within a heart-beat interval and indicating a replace operation on an nfStatus attribute of an NF profile of the NE not supporting SBI service operations and a value of the nfStatus attribute as REGISTERED.

8. The method of claim 1 wherein updating, with the NRF, the status of the NE not supporting SBI service operations includes performing an NFUpdate service operation with the NRF on behalf of the NE not supporting SBI service operations.

9. The method of claim 8 wherein monitoring the status of the NE not supporting SBI service operations includes detecting unreachability of the NE not supporting SBI service operations using a native protocol of the NE not supporting SBI service operations and wherein performing the NFUpdate service operation on behalf of the NE not supporting SBI service operations includes sending a hypertext transfer protocol (HTTP) PATCH message to the NRF indicating a replace operation on an nfStatus attribute of an NF profile of the NE not supporting SBI service operations and a value of the nfStatus attribute as UNDISCOVERABLE.

10. A system for providing service based interface (SBI) support for network elements (NEs) not supporting SBI service operations, the system comprising:
 a cloud native core console (CNCC) for receiving SBI configuration parameters for an NE not supporting SBI service operations and registering, with a network function (NF) repository function (NRF) and using the SBI configuration parameters, the NE not supporting SBI service operations, wherein the CNCC is configured to register the NE not supporting SBI service operations by performing an NFRegister service operation with the NRF on behalf of the NE not supporting SBI service operations;
 an interworking function (IWF) for establishing a connection with the NE not supporting SBI service operations and monitoring, over the connection, status of the NE not supporting SBI service operations; and
 wherein the CNCC is configured to update, with the NRF and based on the status monitored by the IWF, the status of the NE not supporting SBI service operations.

11. The system of claim 10 wherein the CNCC is configured to receive NF profile parameters for creating an NF profile for the NE not supporting SBI service operations.

12. The system of claim 10 wherein the CNCC is configured to perform the NFRegister service operation by transmitting, to the NRF, a hypertext transfer protocol (HTTP) PUT message including an NF profile for the NE not supporting SBI service operations.

13. The system of claim 10 wherein the connection with the NE not supporting SBI service operations comprises a transport layer connection.

14. The system of claim 13 wherein the IWF is configured to monitor the status of the NE not supporting SBI service operations by exchanging, over the connection, Diameter watchdog messages with the NE not supporting SBI service operations.

15. The system of claim 10 wherein the CNCC is configured to update, with the NRF, the status of the NE not supporting SBI service operations with the NRF by performing an NF Heart-Beat service operation with the NRF on behalf of the NE not supporting SBI service operations.

16. The system of claim 15 wherein the IWF is configured to monitor the status of the NE not supporting SBI service operations by detecting, using a native protocol of the NE not supporting SBI service operations, that the NE not supporting SBI service operations is available, and wherein the CNCC is configured to perform the NF Heart-Beat service operation by sending a hypertext transfer protocol (HTTP) PATCH message to the NRF within a heart-beat interval and indicating a replace operation on an nfStatus attribute of an NF profile of the NE not supporting SBI service operations and a value of the nfStatus attribute as REGISTERED.

17. The system of claim 10 wherein the IWF is configured to monitor the status of the NE not supporting SBI service operations by detecting unreachability of the NE not supporting SBI service operations using a native protocol of the NE not supporting SBI service operations and wherein the CNCC is configured to update the status of the NE not supporting SBI service operations by performing an NFUpdate service operation on behalf of the NE not supporting SBI service operations including sending a hypertext transfer protocol (HTTP) PATCH message to the NRF indicating a replace operation on an nfStatus attribute of an NF profile of the NE not supporting SBI service operations and a value of the nfStatus attribute as UNDISCOVERABLE.

18. A non-transitory computer readable medium having stored thereon executable instructions that when executed by a processor of a computer control the computer to perform steps comprising:
 receiving service based interface (SBI) configuration parameters for a network element (NE) not supporting SBI service operations;
 establishing a connection with the NE not supporting SBI service operations;
 registering, with a network function (NF) repository function (NRF) and using the SBI configuration parameters, the NE not supporting SBI service operations, wherein registering the NE not supporting SBI service operations includes performing an NFRegister service operation with the NRF on behalf of the NE not supporting SBI service operations;
 monitoring, over the connection, status of the NE not supporting SBI service operations; and
 updating, with the NRF, the status of the NE not supporting SBI service operations.

* * * * *

UNITED STATES PATENT AND TRADEMARK OFFICE
CERTIFICATE OF CORRECTION

PATENT NO. : 12,225,493 B2
APPLICATION NO. : 17/219366
DATED : February 11, 2025
INVENTOR(S) : Srivastava et al.

Page 1 of 1

It is certified that error appears in the above-identified patent and that said Letters Patent is hereby corrected as shown below:

In the Specification

In Column 7, Line 4, delete "request" and insert -- request. --, therefor.

In Columns 7-8 (TABLE 1), Lines 16-20, delete "Defined in section six point 1.6 point 2.2 of 3GPP TS 29.510. Table one shown below illustrates an example of the attributes that are included in an NF profile," and insert -- NF profile --.

In Column 23, Line 63, delete "2012);" and insert -- 2012). --, therefor.

Signed and Sealed this
Sixth Day of May, 2025

Coke Morgan Stewart
*Acting Director of the United States Patent and Trademark Office*